US011362595B1

(12) United States Patent
Chis et al.

(10) Patent No.: US 11,362,595 B1
(45) Date of Patent: Jun. 14, 2022

(54) POWER CONVERTER PRE-CHARGE WITH LINE SYNCHRONIZATION

(71) Applicant: Rockwell Automation Technologies, Inc., Mayfield Heights, OH (US)

(72) Inventors: Marius G. Chis, Cambridge (CA); Zhong Y. Cheng, Cambridge (CA); Navid R. Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/159,039

(22) Filed: Jan. 26, 2021

(51) Int. Cl.
*H02M 5/04* (2006.01)
*H02M 1/32* (2007.01)
*H02M 1/36* (2007.01)
*H02H 9/02* (2006.01)
*H02M 5/10* (2006.01)
*H02H 1/04* (2006.01)

(52) U.S. Cl.
CPC .............. *H02M 5/04* (2013.01); *H02H 1/043* (2013.01); *H02H 9/02* (2013.01); *H02M 1/32* (2013.01); *H02M 1/36* (2013.01); *H02M 5/10* (2013.01)

(58) Field of Classification Search
CPC ............ H02M 5/04; H02M 5/10; H02M 1/32; H02M 1/36; H02H 9/02; H02H 1/043
See application file for complete search history.

(56) References Cited

U.S. PATENT DOCUMENTS

| 7,095,139 | B2* | 8/2006 | Tsutada | G05F 1/12 323/209 |
| 7,511,975 | B2* | 3/2009 | Hammond | H02H 9/002 323/908 |
| 8,223,515 | B2* | 7/2012 | Abolhassani | H02P 13/06 363/39 |
| 9,680,388 | B2* | 6/2017 | Simms | H02M 5/45 |
| 10,554,148 | B2* | 2/2020 | Brueckner | H02H 1/043 |
| 2009/0284999 | A1* | 11/2009 | Gibbs | H02M 7/062 327/587 |
| 2021/0336550 | A1* | 10/2021 | Liu | H02M 7/49 |

* cited by examiner

*Primary Examiner* — Gary L Laxton
(74) *Attorney, Agent, or Firm* — Scott D. Thorpe; Kunzler Bean & Adamson

(57) ABSTRACT

For power converter pre-charge with line synchronization, a method magnetizes a power transformer of a power converter with a supply voltage from a variable voltage variable frequency supply. The method pre-charges power cells of the power converter fed from the power transformer to a specified voltage with the supply voltage. The method further modifies a primary amplitude, a primary phase, and a primary frequency of a primary winding of the power converter with the supply voltage to match a main amplitude, a main phase, and a main frequency of a main voltage of a main power source. In response to matching the primary amplitude, the primary phase, and the primary frequency to the main amplitude, the main phase, and the main frequency, the method connects the main power source to the power transformer.

20 Claims, 15 Drawing Sheets

POWER CONVERTER PRE-CHARGE WITH LINE SYNCHRONIZATION

BACKGROUND INFORMATION

The subject matter disclosed herein relates to power converter pre-charge with line synchronization.

BRIEF DESCRIPTION

A method for power converter pre-charge with line synchronization is disclosed. The method magnetizes a power transformer of a power converter with a supply voltage from a variable voltage variable frequency supply. The method pre-charges power cells of the power converter fed from the power transformer to a specified voltage with the supply voltage. The method further modifies a primary amplitude, a primary phase, and a primary frequency of a primary winding of the power converter with the supply voltage to match a main amplitude, a main phase, and a main frequency of a main voltage of a main power source. In response to matching the primary amplitude, the primary phase, and the primary frequency to the main amplitude, the main phase, and the main frequency, the method connects the main power source to the power transformer.

An apparatus for power converter pre-charge with line synchronization is disclosed. The apparatus includes a variable voltage variable frequency supply, a controller, and a line connection module. The variable voltage variable frequency supply magnetizes a power transformer of a power converter with a supply voltage applied to a tertiary winding and pre-charges power cells of the power converter fed from the power transformer to a specified voltage with the supply voltage. The controller modifies a primary amplitude, a primary phase, and a primary frequency of a primary winding of the power converter with the supply voltage to match a main amplitude, a main phase, and a main frequency of a main voltage of a main power source. The line connection module, in response to matching the primary amplitude, the primary phase, and the primary frequency to the main amplitude, the main phase, and the main frequency, connects the main power source to the power transformer.

A system for power converter pre-charge with line synchronization is disclosed. The system includes a power converter, a variable voltage variable frequency supply, a controller, and a line connection module. The power converter includes a primary winding, a core, secondary winding sets, and a tertiary winding that powers a fan. The variable voltage variable frequency supply magnetizes a power transformer of a power converter with a supply voltage applied to the tertiary winding and pre-charges power cells of the power converter fed from the power transformer to a specified voltage with the supply voltage. The controller modifies a primary amplitude, a primary phase, and a primary frequency of a primary winding with the supply voltage to match a main amplitude, a main phase, and a main frequency of a main voltage of a main power source. The line connection module in response to matching the primary amplitude, the primary phase, and the primary frequency to the main amplitude, the main phase, and the main frequency, connects the main power source to the power transformer.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
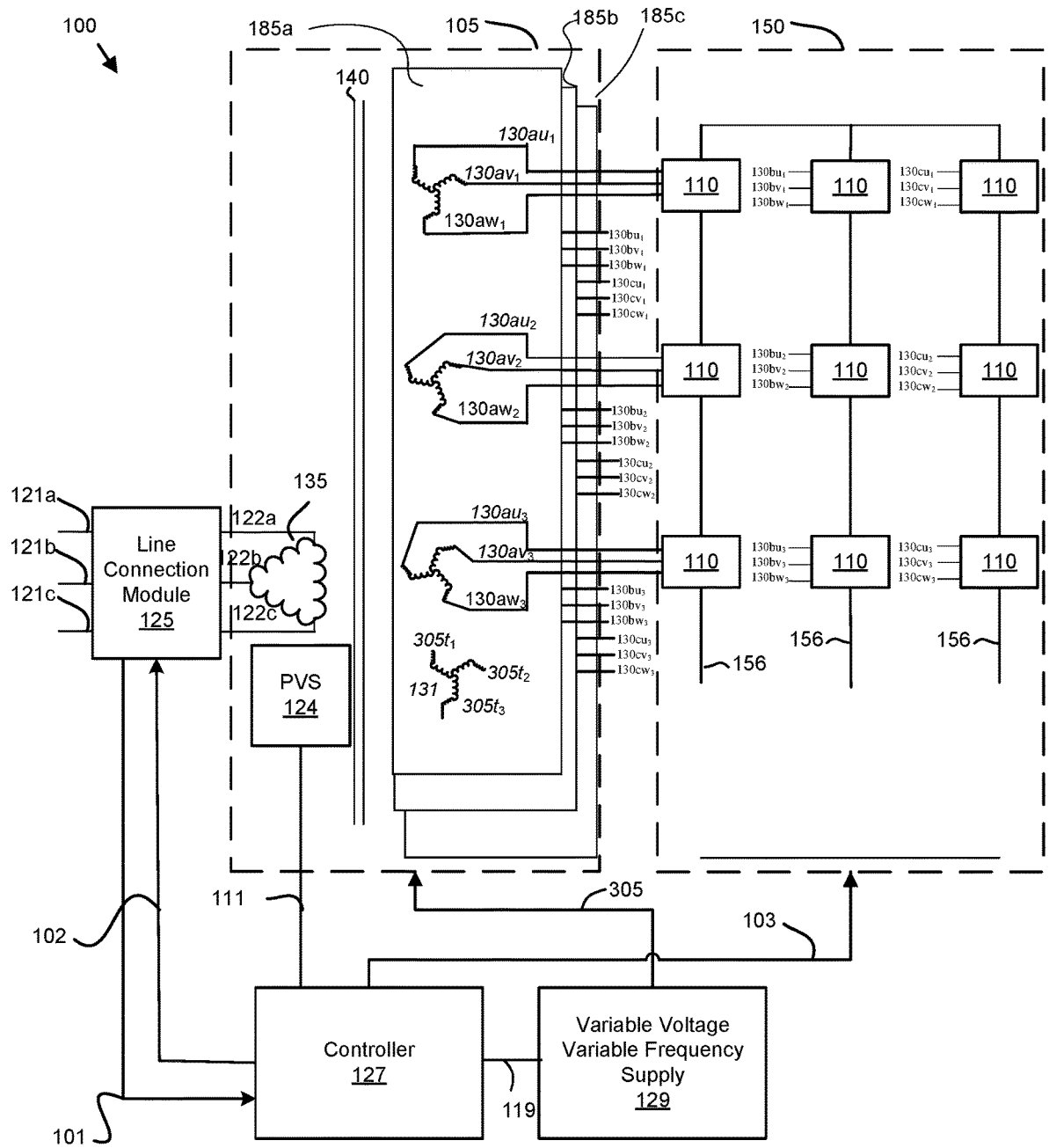
FIG. 1A is a schematic block diagram of a power supply according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a power converter 100. The power converter 100 supplies a three-phase AC output 156 with variable voltage and frequency to the load. The AC output 156 may drive one or more motors as the load. The power converter 100 includes a transformer 105 and power cell sets 150.

In the depicted embodiment, the transformer 105 includes primary winding 135, a core 140, and a plurality of secondary winding sets 130. The primary winding 135 of the transformer 105 receives a three-phase main voltage of a main power source 121a-c. The plurality of secondary winding sets 130 are magnetically coupled with the primary winding 135 and step the three-phase primary voltage up or down to a secondary voltage. In one embodiment, there is phase shifting between the different secondary winding sets 130. The transformer 105 is shown with Delta (Δ) connected primary winding 135 and zigzag connected secondary winding sets 130. It can also be Wye (Y) connected primary winding 135 and extended Delta (Δ) secondary winding set 130, or polygon connected secondary winding set 130. The power cells 110 of the power cell sets 150 are connected to the secondary winding sets 130. A controller 127 may generate control signals 103 that drive the power cells 110 deliver power to the load.

When the power converter 100 is powered up, there is an inrush of current from the main power source 121a-c to magnetize the primary winding 135 with primary power 122, magnetize the secondary winding sets 130 of the transformer 105, and charge the capacitive storage in the power cells 110. The inrush current may cause a brown out on the main power source 121a-c. For example, the inrush current may trip protective devices such as fuses and/or circuit breakers. In addition, the inrush current may overstress the power cells 110. For example, power cell fuses may be opened.

The embodiments limit the inrush current by pre-charging the power cells 110 using a variable voltage variable frequency supply 129 to supply a charging current via a tertiary winding 131 of the power transformer 105. In one embodiment, the tertiary winding 131 powers a set of cabinet fans after the power converter 100 powers up.

In addition, the embodiments may magnetize the transformer 105. The embodiments may further modify a primary amplitude, a primary phase, and a primary frequency of the primary power 122 to match a main amplitude, a main phase, and the main frequency of the main power source 121. In response to matching the primary amplitude, the primary phase, and the primary frequency to the main amplitude, the main phase, and the main frequency, the embodiments may connect the main power source 121 to the power transformer 105. As a result, stress to the system 100 is reduced, improving the life of the power converter 100 and reducing failures.

In the depicted embodiment, a line connection module 125 connects the main power source 121 to the primary winding 135 as primary power 122. The line connection module 125 may communicate a sync detection signal 101 to a controller 127 to indicate amplitude and/or phase matching between power source 121 and transformer primary power 122. The controller 127 may communicate a switch signal 102 to the line connection module 125 to connect the main power source 121 to the primary winding 135 as the primary power 122. In addition, the controller may communicate a charging activation signal 119 to a variable voltage variable frequency supply 129 to activate the charging current as will be described in more detail hereafter.

In one embodiment, a primary voltage sensor 124 measures a primary voltage of the primary winding 135 and communicates the primary voltage to the controller 127 via a primary voltage signal 111.

Figure 1B:
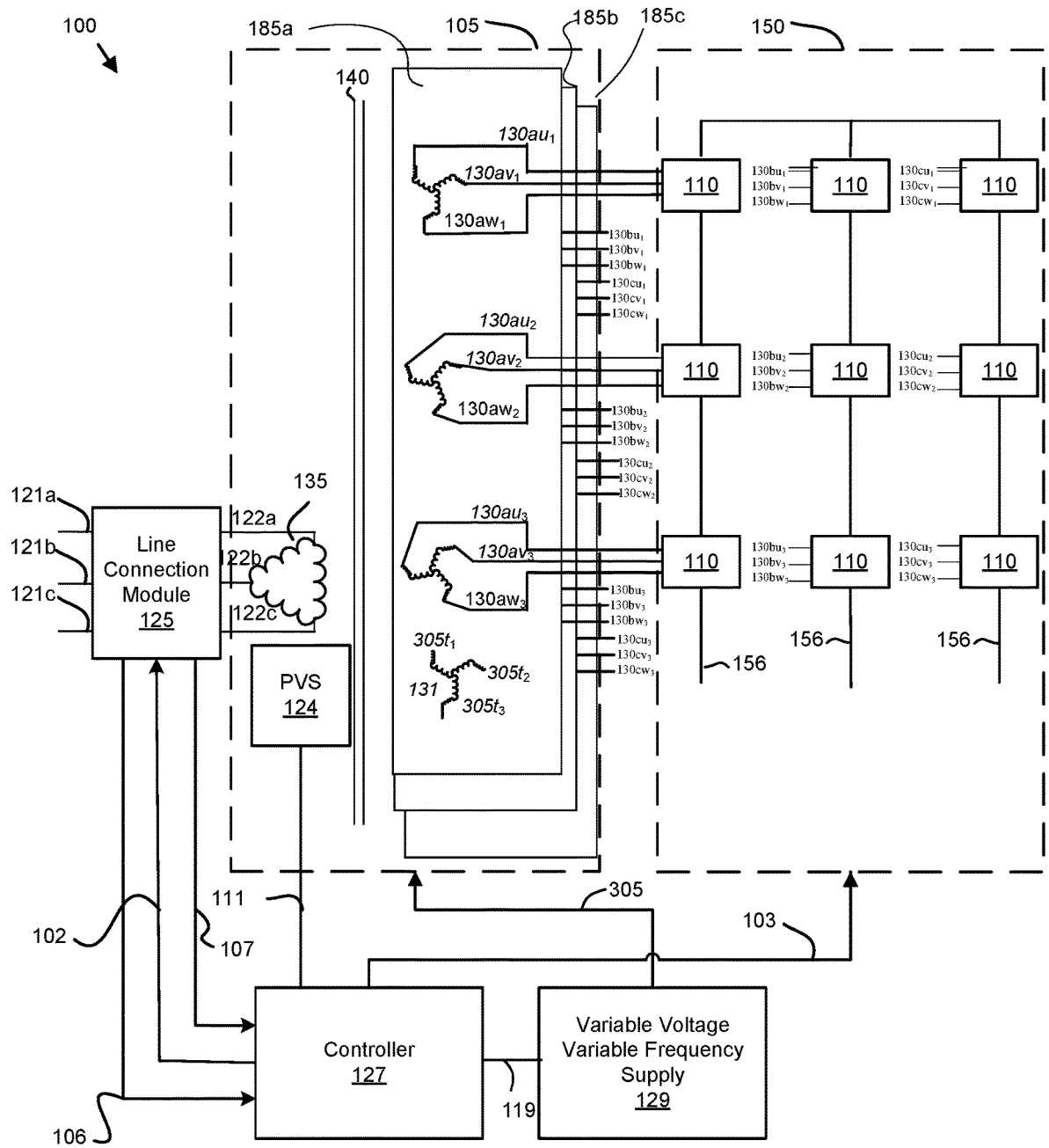
FIG. 1B is a schematic block diagram of a power supply according to an alternate embodiment.

FIG. 1B is a schematic block diagram of a power converter 100. The power converter 100 is an alternate embodiment of the power converter 100 of FIG. 1A. In the depicted embodiment, the controller 127 receives a main sensor signal 106 and a primary transformer signal 107 from the line connection module 125.

Figure 1C:
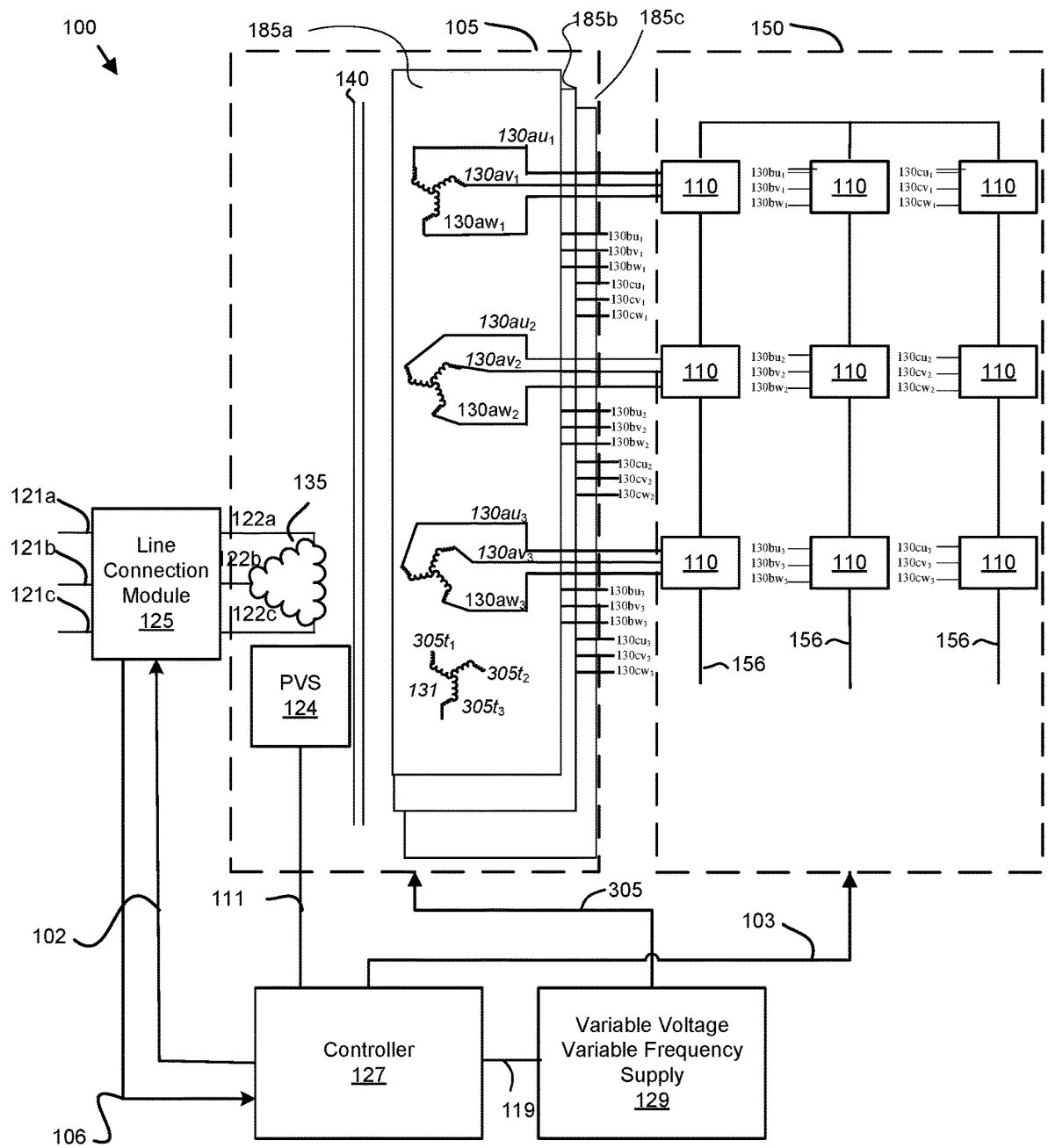
FIG. 1C is a schematic block diagram of a power supply according to an alternate embodiment.

FIG. 1C is a schematic block diagram of a power converter 100. The power converter 100 is an alternate embodiment of the power converter 100 of FIG. 1A. In the depicted embodiment, the controller 127 receives the main sensor signal 106 from the line connection module 125.

Figure 1D:
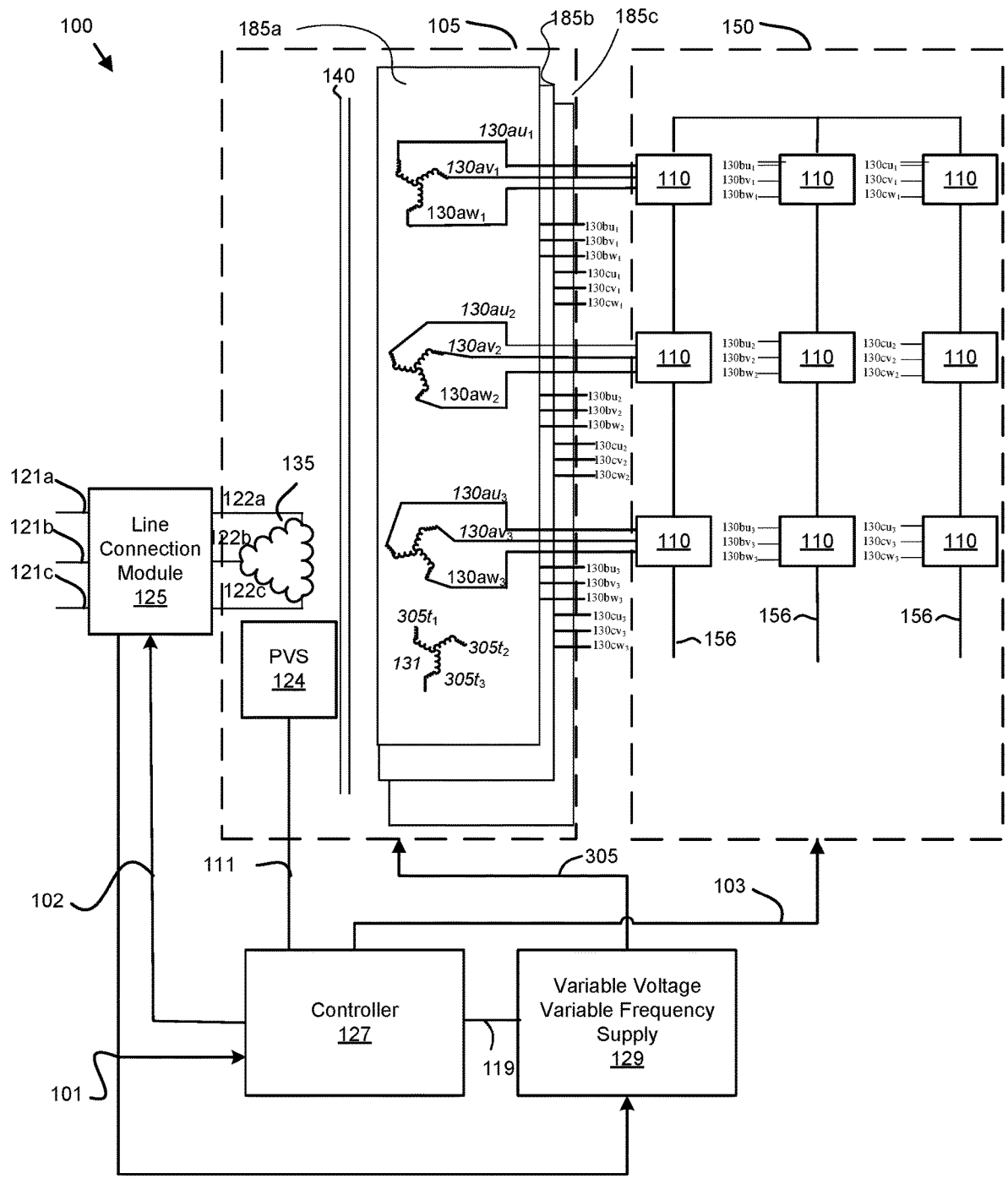
FIG. 1D is a schematic block diagram of a power supply according to an alternate embodiment.

FIG. 1D is a schematic block diagram of a power converter 100. The power converter 100 is an alternate embodiment of the power converter 100 of FIG. 1A. In the depicted embodiment, the controller 127 and the variable voltage variable frequency supply 129 receive the sync detection signal 101 from the line connection module 125. In one embodiment, the variable voltage variable frequency supply 129 activates the charging current in response to the sync detection signal 101 as will be described hereafter.

Figure 2A:
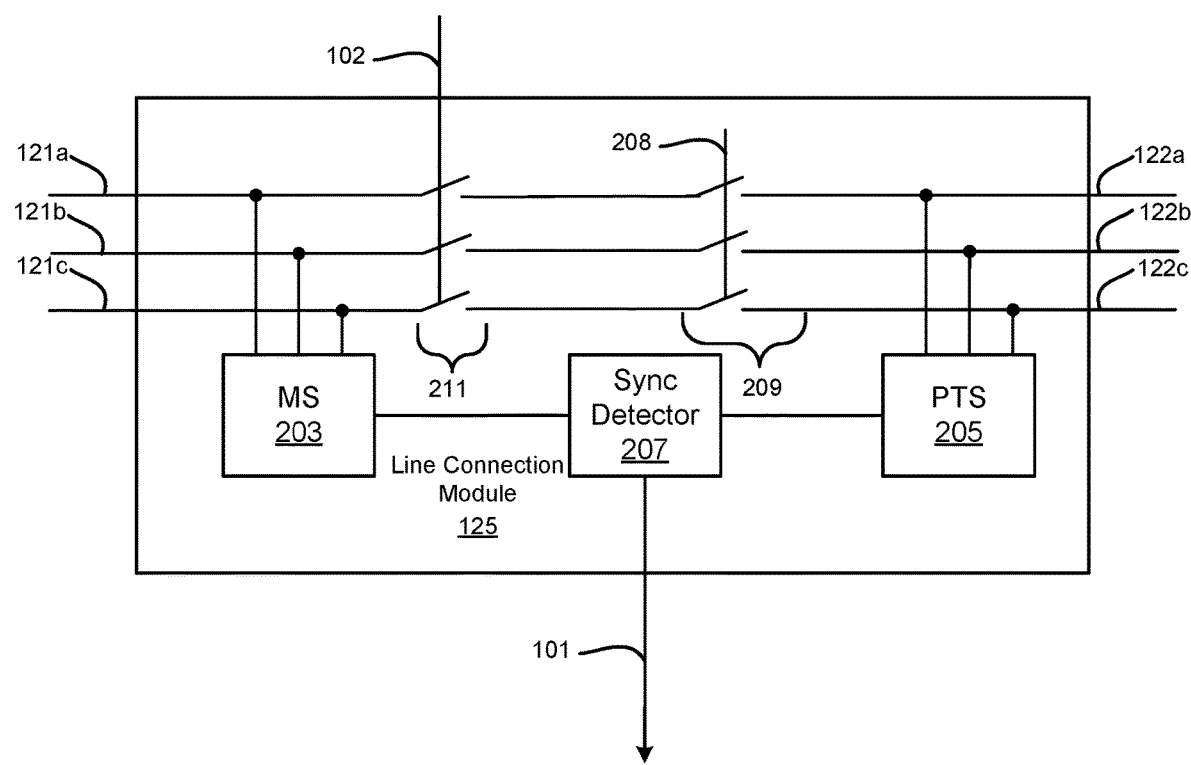
FIG. 2A is a schematic block diagram of a line connection module according to an embodiment.

FIG. 2A is a schematic block diagram of one embodiment of the line connection module 125. In the depicted embodiment, the line connection module 125 of FIGS. 1A and 1D is shown. The line connection module 125 receives the main power source 121. A main sensor 203 measures the main amplitude, the main phase, and/or the main frequency of the main power source 121. A primary transformer sensor 205 measures the primary amplitude, the primary phase, and/or the primary frequency of the primary power 122. A sync detector 207 determines if the primary amplitude, the primary phase, and/or the primary frequency matches the main amplitude, the main phase, and/or the main frequency. In response to the primary amplitude, the primary phase, and/or the primary frequency matching the main amplitude, the main phase, and/or the main frequency, the sync detector 207 generates the sync detection signal 101. The sync detection signal 101 may be communicated to the controller 127 and/or the variable voltage variable frequency supply 129.

In one embodiment, the switch signal 102 may activate an electromagnetic switch 211. Activating the electromagnetic switch 211 may connect the main power source 121 to the primary power 122. In a certain embodiment, a manual switch 209 may also connect the main power source 121 to the primary power 122. The manual switch 209 may include a mechanical interconnect 208 connecting a plurality of manual switches 209.

Figure 2B:
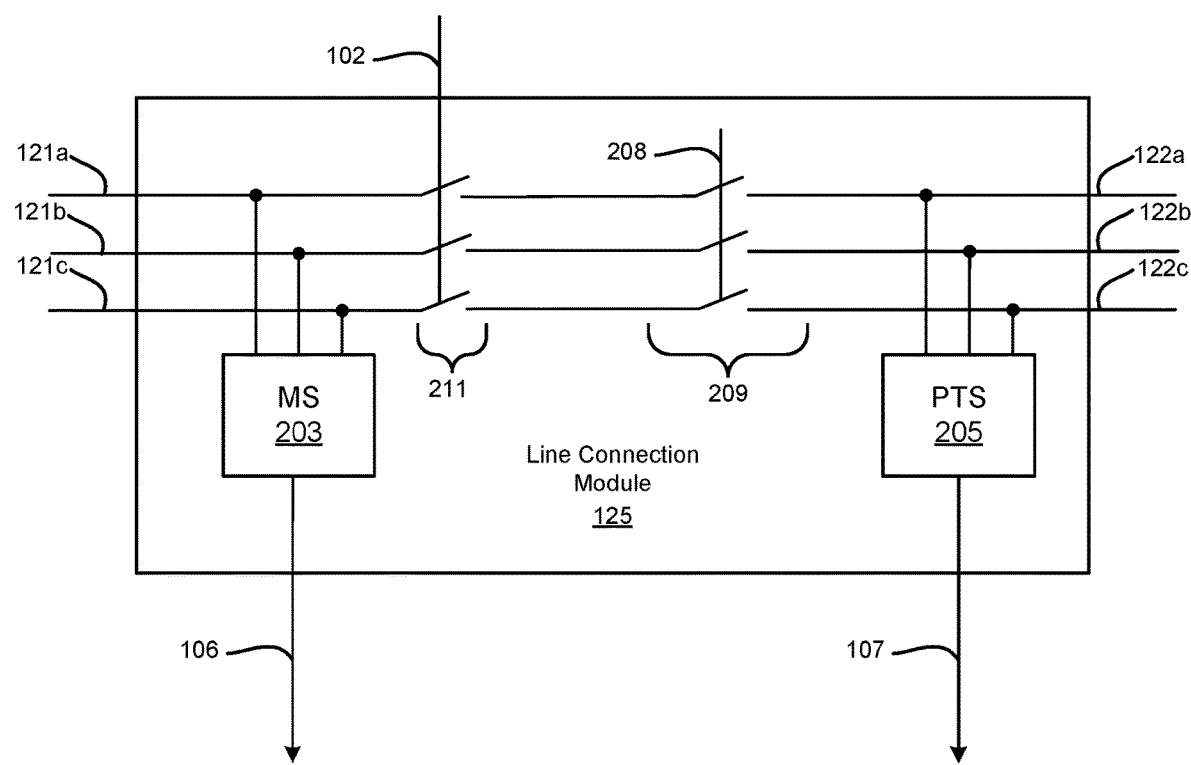
FIG. 2B is a schematic block diagram of a line connection module according to an alternate embodiment.

FIG. 2B is a schematic block diagram of the line connection module 125. In the depicted embodiment, the line connection module 125 of FIG. 1B is shown. The main sensor 203 measures the main amplitude, the main phase, and/or the main frequency of the main power source 121. The main sensor 203 may communicate the main amplitude, the main phase, and/or the main frequency via the main sensor signal 106 to the controller 127. In addition, the primary transformer sensor 205 may measure the primary amplitude, the primary phase, and/or the primary frequency of the primary power 122. The primary transformer sensor 205 may communicate the primary amplitude, the primary phase, and/or the primary frequency via the primary transformer signal 107 to the controller 127. The controller 127 may determine if the primary amplitude, the primary phase, and/or the primary frequency matches the main amplitude, the main phase, and/or the main frequency. The electromagnetic switch 211 and/or the manual switch 209 may connect the main power source 121 to the primary power 122.

Figure 2C:
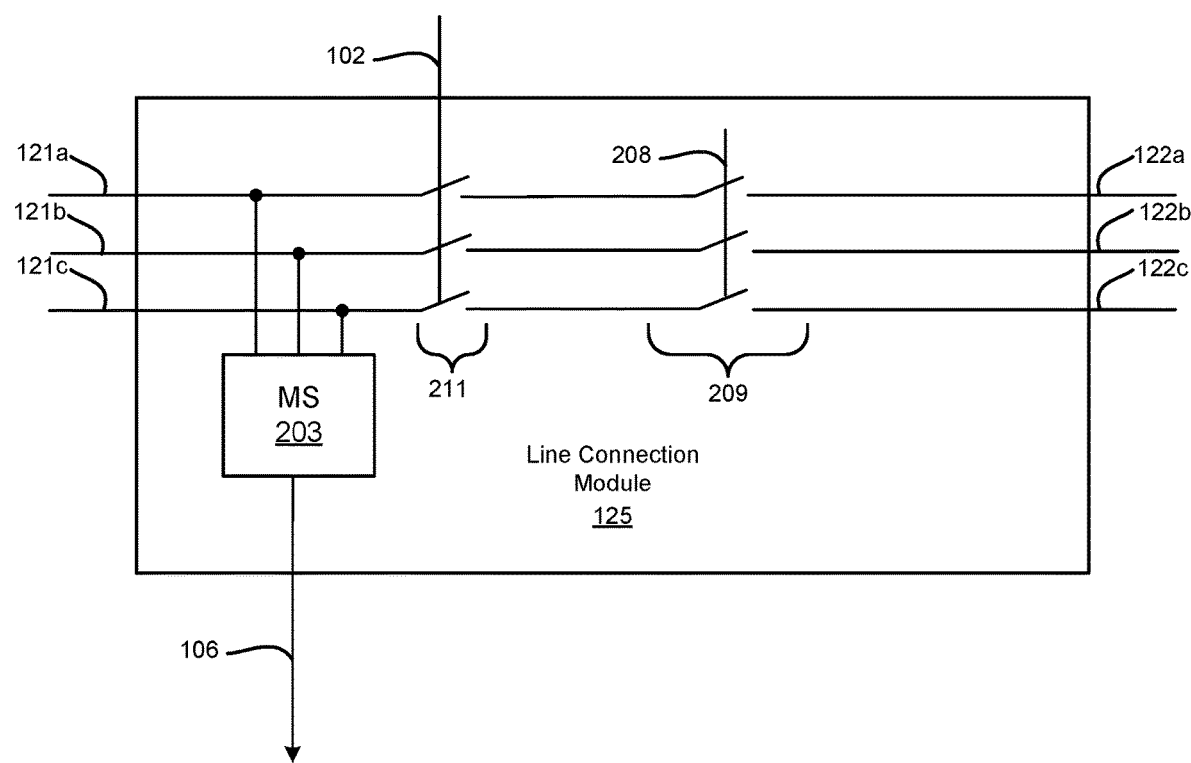
FIG. 2C is a schematic block diagram of a line connection module according to an alternate embodiment.

FIG. 2C is a schematic block diagram of a line connection module 125. In the depicted embodiment, the line connection module 125 of FIG. 1C is shown. The main sensor 203 measures the main amplitude, the main phase, and/or the main frequency of the main power source 121. The main sensor 203 may communicate the main amplitude, the main phase, and/or the main frequency via the main sensor signal 106 to the controller 127. The controller 127 may further receive the primary amplitude, the primary phase, and/or the primary frequency of the primary voltage from the primary voltage signal 111 measured by the primary voltage sensor 124. The controller 127 may determine if the primary amplitude, the primary phase, and/or the primary frequency matches the main amplitude, the main phase, and/or the main frequency.

Figure 3A:
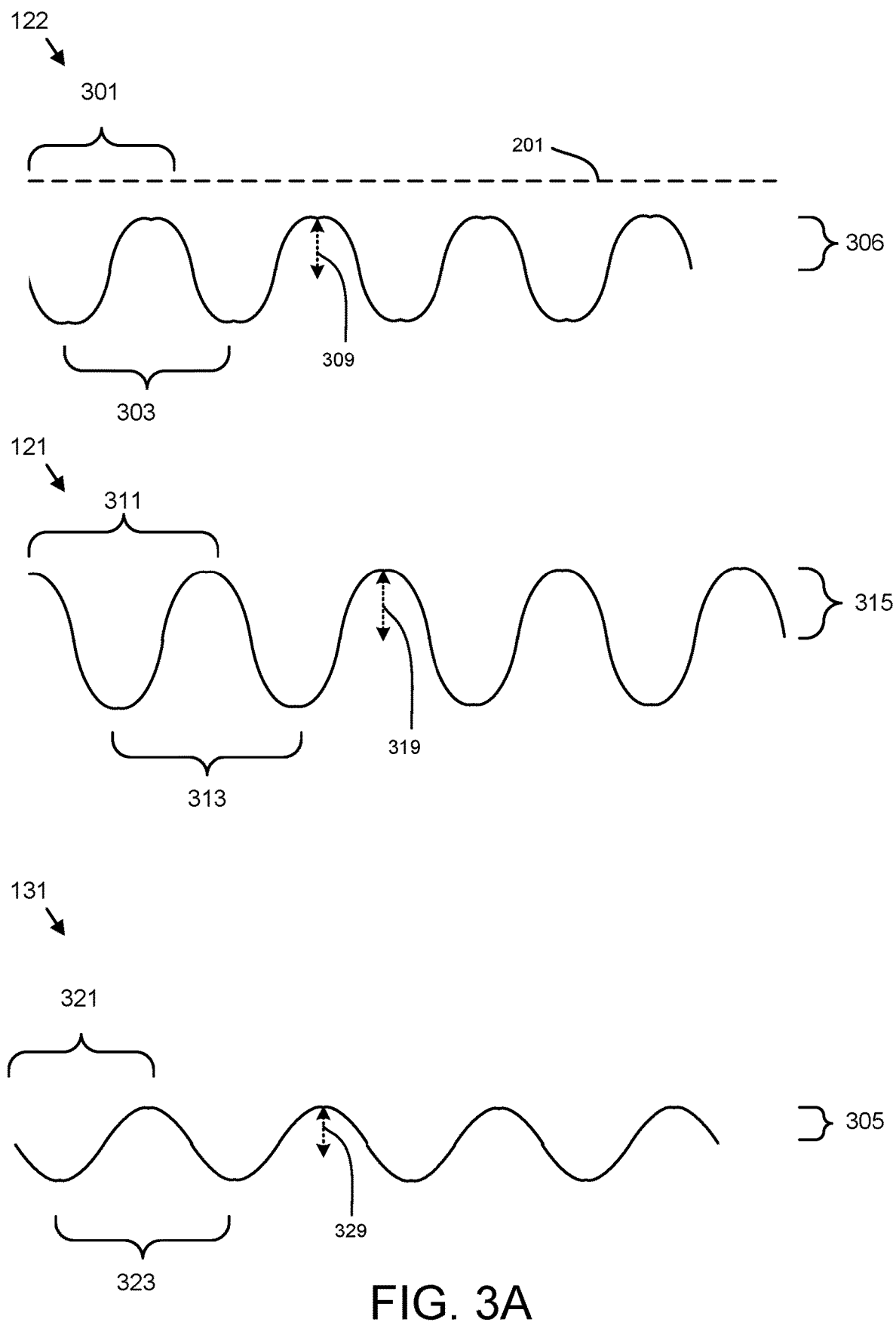
FIG. 3A is a waveform drawing of a main power source and a primary power according to an embodiment.

FIG. 3A is a waveform drawing of voltages of the main power source 121, the primary power 122, and the tertiary winding 131. In the depicted embodiment, the primary voltage 306, the primary amplitude 309, the primary phase 301, and the primary frequency 303 at the primary winding 135 resulting from the charging current of the supply voltage 305 is shown.

The supply voltage 305, supply amplitude 329, supply phase 321, and supply frequency 323 of the tertiary winding 131 is also shown. The primary frequency 303 and supply frequency 323 may be the same frequency. The supply voltage 305 may be much less than the primary voltage 306. In addition, the main amplitude 319, the main phase 311, and the main frequency 313 of the main voltage 315 of the main power source 121 is also shown. In the depicted embodiment, the primary amplitude 309, the primary phase 301, and the primary frequency 303 at the primary winding 135 does not match the main amplitude 319, the main phase 311, and the main frequency 313. In one embodiment, the primary voltage 306 is less than a specified voltage 201. The specified voltage 201 may be a percentage of the main voltage 315. The primary amplitude 309, the primary phase 301, and the primary frequency 303 at the primary winding 135 may not match the main amplitude 319, the main phase 311, and the main frequency 313 at the commencement of pre-charging the power converter 100.

Figure 3B:
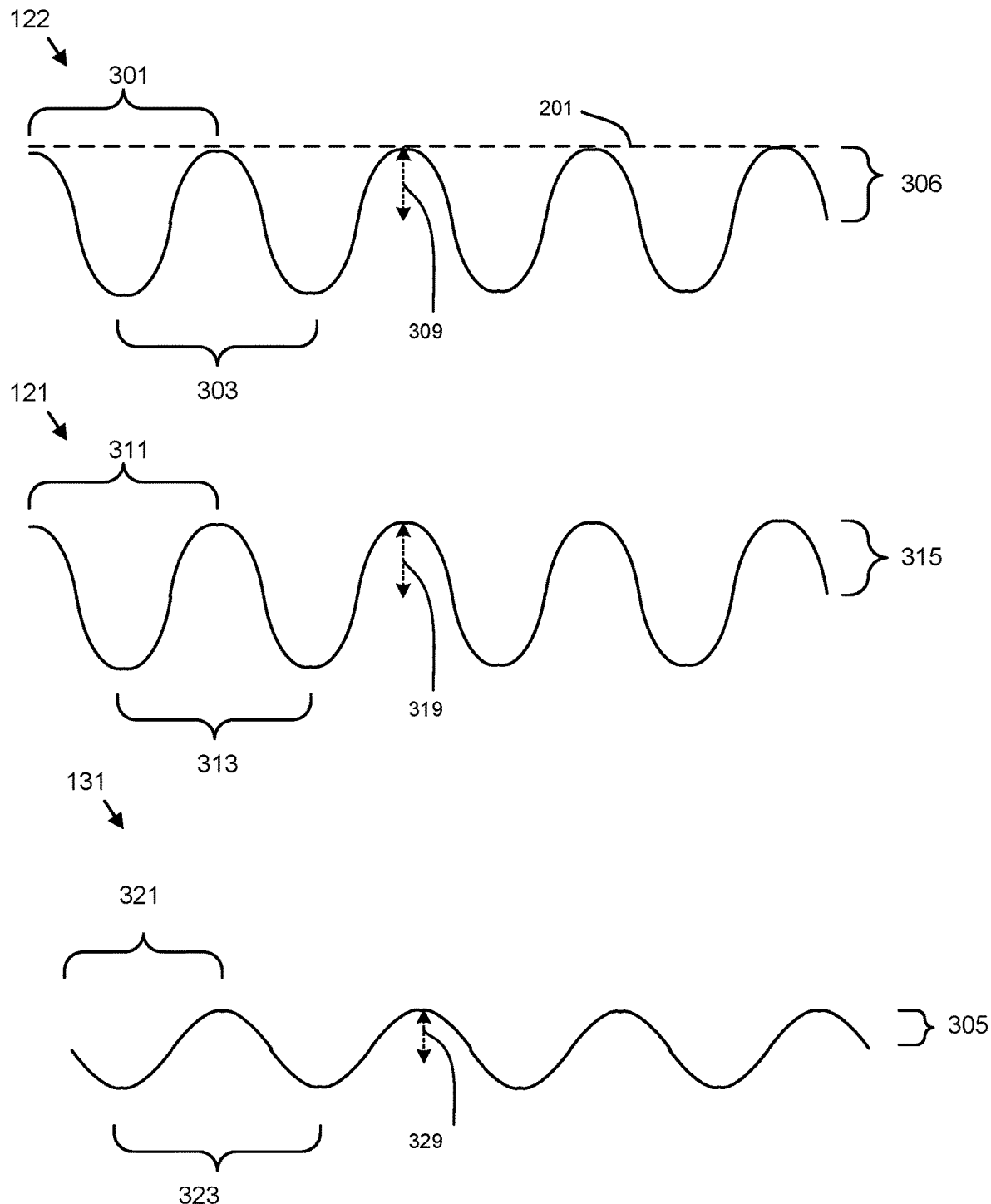
FIG. 3B is a waveform drawing of a main power source and a primary power according to an embodiment.

FIG. 3B is a waveform drawing of main power source 121 and the primary power 122. In the depicted embodiment, the primary amplitude 309, the primary phase 301, and the primary frequency 303 at the primary winding 135 matches the main amplitude 319, the main phase 311, and the main frequency 313. In addition, the primary voltage amplitude 309 is at least the specified voltage 201.

Figure 3C:
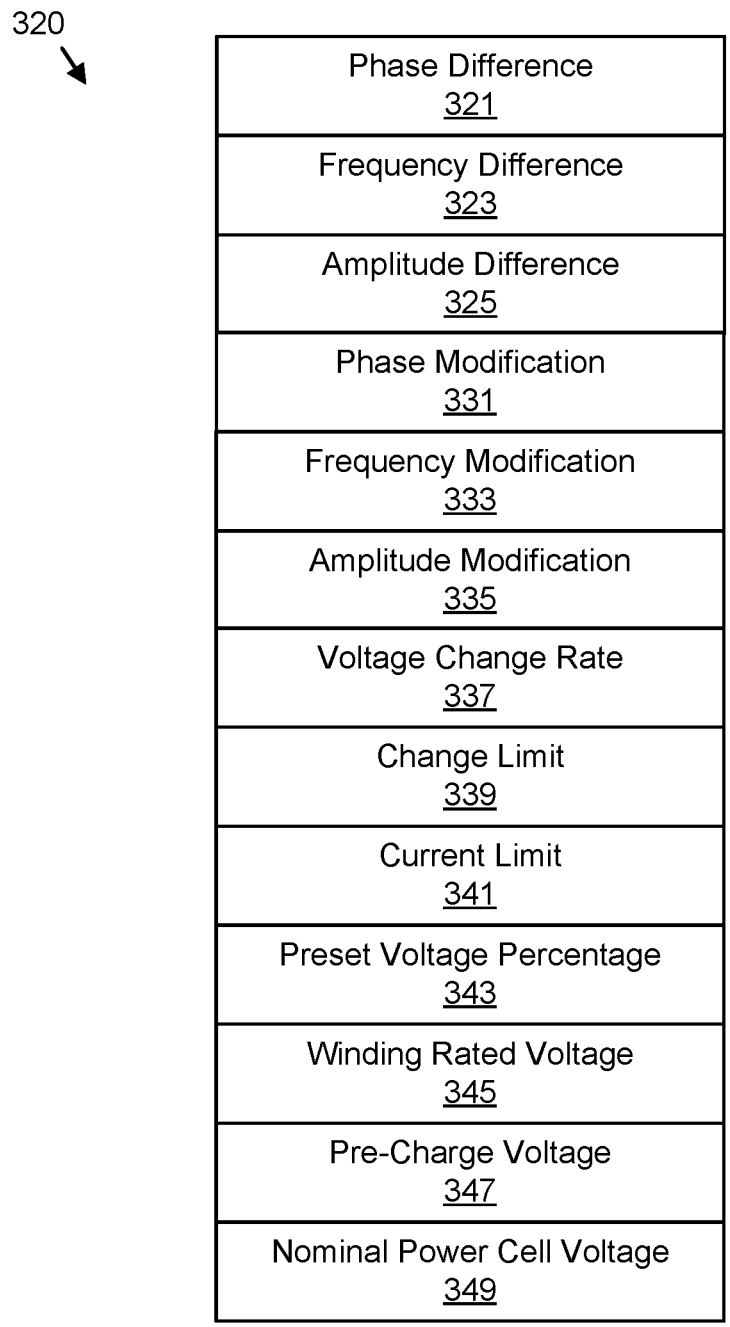
FIG. 3C is a schematic block diagram of synchronization data according to an embodiment.

FIG. 3C is a schematic block diagram of synchronization data 320. The synchronization data 320 may be used to match the primary amplitude 309, the primary phase 301, and the primary frequency 303 to the main amplitude 319, the main phase 311, and the main frequency 313. In addition, the synchronization data 320 may be used to determine when to connect the main power source 121 to the power transformer 105. The synchronization data 320 may be organized as a data structure in a memory. In the depicted embodiment, the synchronization data 320 includes a phase difference 321, a frequency difference 323, an amplitude difference 325, a phase modification 331, a frequency modification 333, an amplitude modification 335, a voltage change rate 337, a change limit 339, a current limit 341, a preset voltage percentage 343, a winding rated voltage 345, a pre-charge voltage 347, and a nominal power cell voltage 349.

The phase difference 321 may record a difference between the main phase 311 and the primary phase 301. The frequency difference 323 may record a difference between the main frequency 313 and the primary frequency 303. The amplitude difference 325 may record the difference between the main amplitude 319 and the primary amplitude 309.

The phase modification 331 may specify a change to the primary phase 301. The frequency modification 333 may specify a change to the primary frequency 303. The amplitude modification 335 may specify a change to the primary amplitude 309. The phase modification 331, the frequency modification 333, and the amplitude modification 335 may be used to modify the supply voltage 305 to drive the primary amplitude 309, the primary phase 301, and the primary frequency 303 to the main amplitude 319, the main phase 311, and the main frequency 313 respectively as shown in FIG. 3B.

The voltage change rate 337 may record a change in the supply voltage 305. In one embodiment, the supply voltage 305 is controlled to maintain a voltage change rate 337 that is less than the change limit 339. The current limit 341 may specify a maximum value for the charge current.

The winding rated voltage 345 may specify a maximum voltage for the primary winding 135. The nominal power cell voltage 349 may specify a nominal voltage for the power cells 110. The preset voltage percentage 343 may specify a percentage of the winding rated voltage 345 and/or nominal power cell voltage 349. The preset voltage percentage 343 may be in a stable range. The preset voltage percentage 343 may be in the range of 70 to 90 percent. In a certain embodiment, the preset voltage percentage 343 is 80 percent.

The pre-charge voltage 347 may specify a nominal voltage for pre-charging the power cells 110. The pre-charge voltage 347 may be the preset voltage percentage 343 of the nominal power cell voltage 349.

Figure 4A:
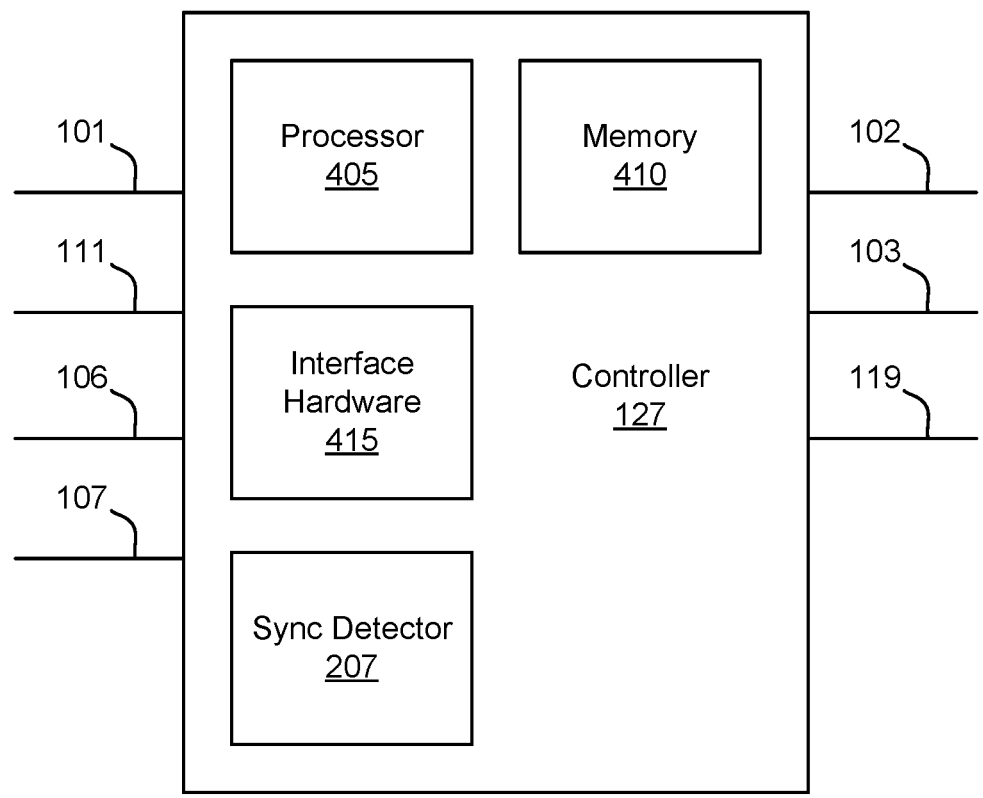
FIG. 4A is a schematic block diagram of a controller according to an embodiment.

FIG. 4A is a schematic block diagram of the controller 127. In the depicted embodiment, the controller 127 includes a processor 405, a memory 410, interface hardware 415, and the sync detector 207. The memory 410 may store code and data. The processor 405 may execute the code and process the data. The interface hardware 415 may communicate with other devices such as the line connection module 125, the primary voltage sensor 124, the power cells 110, and/or the variable voltage variable frequency supply 129. The interface hardware 415 may receive the sync detection signal 101, the primary voltage signal 111, the main sensor signal 106, and/or the primary transformer signal 107. In addition, the interface hardware 415 may transmit the switch signal 102, the control signals 103, and/or the charging activation signal 119.

Figure 4B:
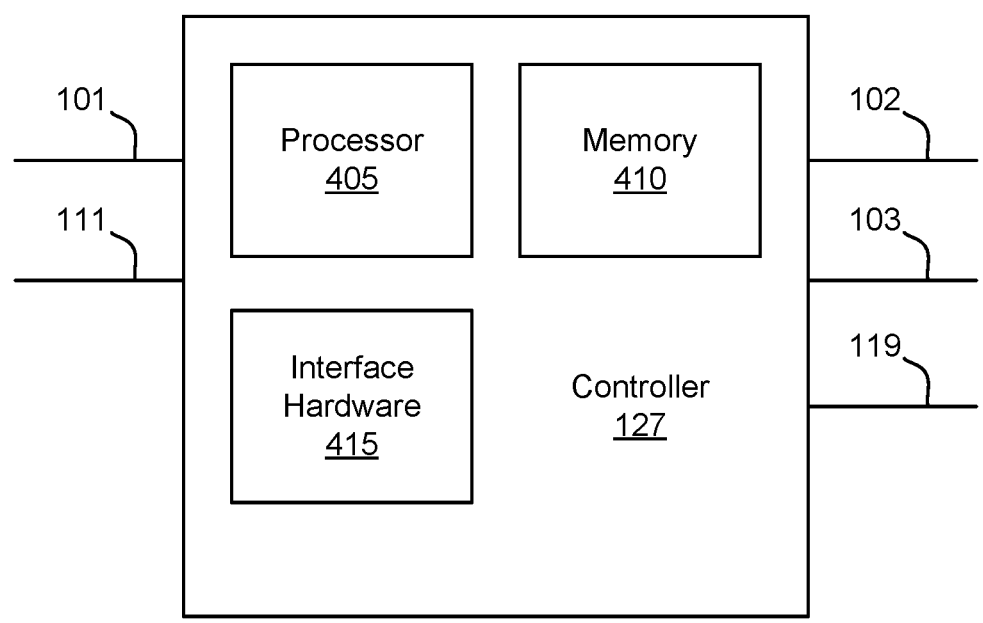
FIG. 4B is a schematic block diagram of a controller according to an alternate embodiment.

FIG. 4B is a schematic block diagram of one embodiment of the controller 127. In the depicted embodiment, the controller 127 includes the processor 405, the memory 410, and interface hardware 415. The interface hardware 415 may receive the sync detection signal 101 and/or the primary voltage signal 111. In addition, the interface hardware 415 may transmit the switch signal 102, the control signals 103, and/or the charging activation signal 119.

Figure 5A:
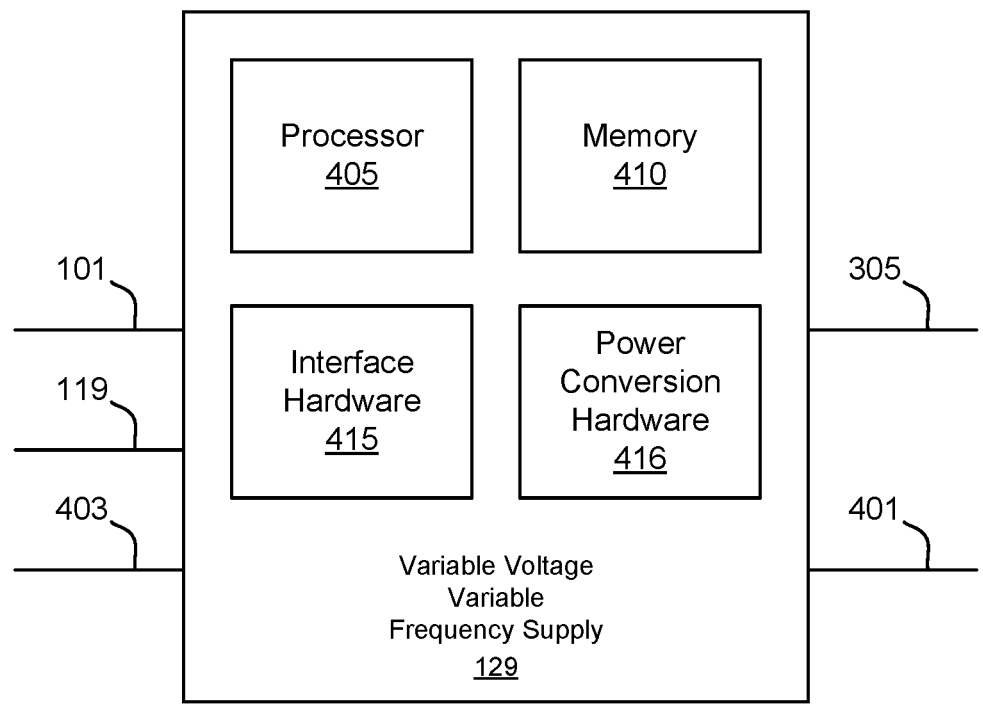
FIG. 5A is a schematic block diagram of a variable voltage variable frequency supply according to an embodiment.

FIG. 5A is a schematic block diagram of one embodiment of a portion of the variable voltage variable frequency supply 129. The variable voltage variable frequency supply 129 may provide the supply voltage 305. In the depicted embodiment, the variable voltage variable frequency supply 129 includes a processor 405, a memory 410, interface hardware 415, and power conversion hardware 416. The interface hardware 415 may receive the sync detection signal 101 and/or the charging activation signal 119. In one embodiment, the interface hardware 415 activates one or more switches as will be shown in FIG. 5B.

The power conversion hardware 416 may convert an external control power 403 to the supply voltage 305.

Figure 5B:
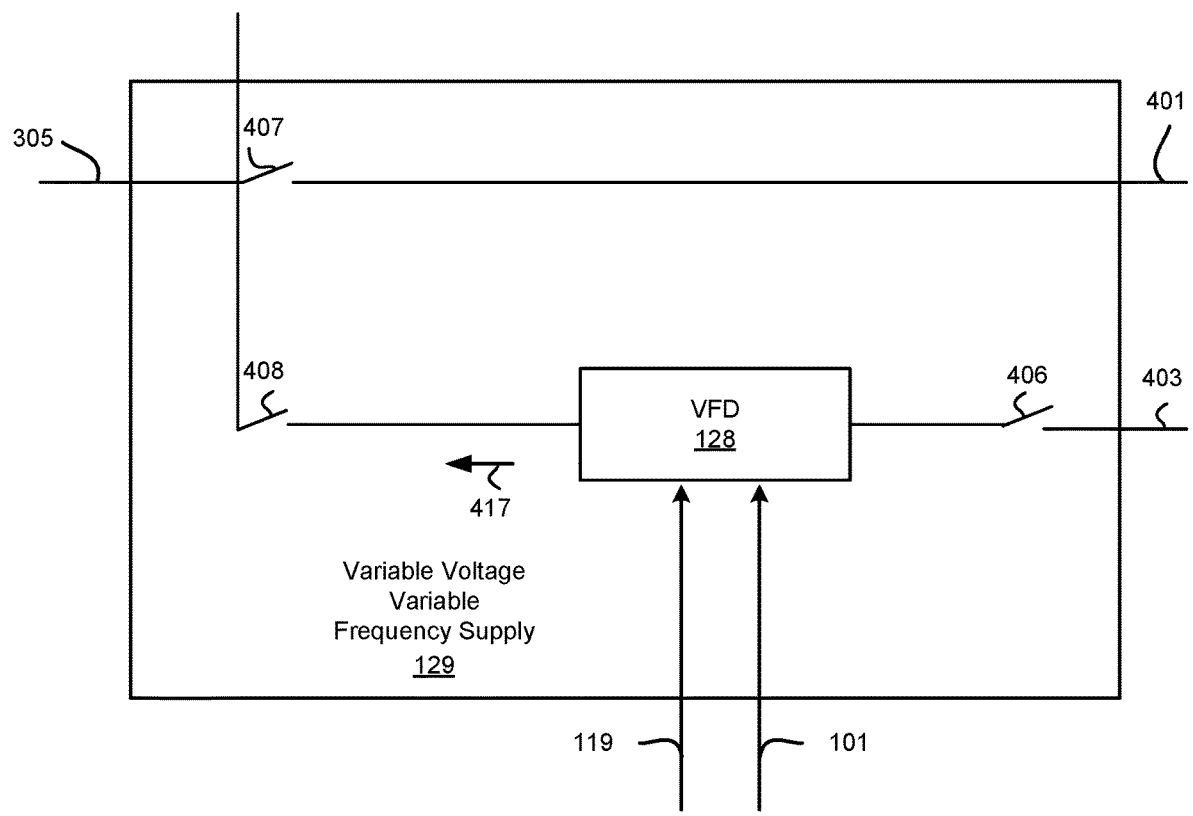
FIG. 5B is a schematic block diagram of a variable voltage variable frequency supply according to an alternate embodiment.

FIG. 5B is a schematic block diagram of one embodiment of a portion of the variable voltage variable frequency supply 129. The variable voltage variable frequency supply 129 may be implemented with electronic components. In one embodiment, the variable voltage variable frequency supply 129 includes the processor 405, the memory 410, and the interface hardware 415 of FIG. 5A. In the depicted embodiment, the variable voltage variable frequency supply 129 receives the external control power 403 and outputs the supply voltage 305. In addition, power may be transferred from the tertiary winding 131 via the cabinet fan power 401 to the set of fans. The external control power 403, supply voltage 305, and/or cabinet fan power 401 may be three-phase power. In one embodiment, the external control power 403 is independent of the main power source 121.

In the depicted embodiment, in response to the charging activation signal 119, the variable voltage variable frequency supply 129 activates a power switch 406 supplying the external power 403 to a variable frequency drive (VFD) 128. In response to the charging activation signal 119, the VFD 128 generates the charging current 417 The variable voltage variable frequency supply 129 may further activate a supply switch 408 to supply the charging current 417 via the supply voltage 305 to the power converter 100. In one embodiment, the variable voltage variable frequency supply 129 opens a fan switch 407 in response to the charging activation signal 119 so that the cabinet fan (not shown) is not powered.

In one embodiment, if the charging activation signal 119 is not activated, the variable voltage variable frequency supply 129 may open the power switch 406 and the supply switch 408 and close the fan switch 407. As a result, the tertiary winding 131 may supply power to the cabinet fan (not shown).

Figure 6A:
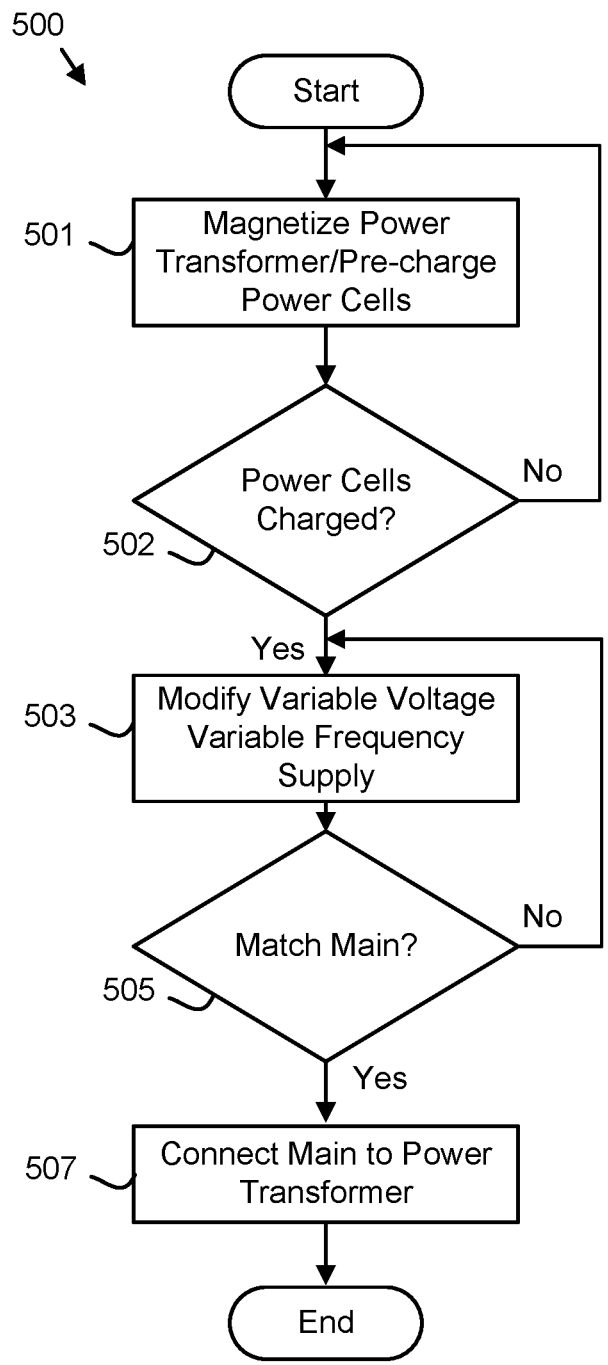
FIG. 6A is a schematic flow chart diagram of a pre-charge method according to an embodiment.

FIG. 6A is a schematic flow chart diagram of a pre-charge method 500. The method 500 may pre-charge the power converter 100 and connect the main power source 121 to the primary winding 135 when activating the power converter 100. The method 500 may be performed by the controller 127, the line connection module 125, and/or the variable voltage variable frequency supply 129.

The method 500 starts, and in one embodiment, the variable voltage variable frequency supply 129 magnetizes 501 the power transformer 105 of the power converter 100 and pre-charges the power cells 110. The power transformer 105 may be magnetized 501 in response to powering up the power converter 100. The variable voltage variable frequency supply 129 may magnetize 501 the power transformer 105 with the supply voltage 305. The variable voltage variable frequency supply 129 may further pre-charge 501 the power cells 110 with the supply voltage 305. The variable voltage variable frequency supply 129 may pre-charge the tertiary winding 131 of the power transformer 105 with the supply voltage 305. The power cells 110 may be pre-charged to the pre-charge voltage 345. The pre-charge voltage 345 may be the preset voltage percentage 343 of the nominal power cell voltage 349.

The controller 127 may assert the charging activation signal 119 in response to powering up the power converter 100. In one embodiment, the variable voltage variable frequency supply 129 activates the power switch 406 supplying the external control power 403 to the VFD 128. In response to the charging activation signal 119, the VFD 128 generates the charging current 417. The variable voltage variable frequency supply 129 may further activate the supply switch 408 to supply the charging current 410 and the supply voltage 305 to the power converter 100. In one embodiment, the variable voltage variable frequency supply 129 opens the fan switch 407 in response to the charging activation signal 119.

The controller 127 may determine 502 whether the power cells 110 are charged. If the power cells 110 are not charged, the variable voltage variable frequency supply 129 may continue to magnetize 501 the power transformer 105 of the power converter 100 and pre-charge the power cells 110.

If the power cells are charged, the controller 127 may modify 503 the primary amplitude 309, the primary phase 301, and/or the primary frequency 303 of the primary winding 135 with the supply voltage 305 to match the main amplitude 319, the main phase 311, and/or the main frequency 313 of the main voltage 315 of the main power source 12. The primary amplitude 309, the primary phase 301, and the primary frequency 303 may be modified 503 to prevent overshoot of the main amplitude 319, the main phase 311, and/or the main frequency 313 by the primary amplitude 309, the primary phase 301, and/or the primary frequency 303. The modification 503 of the primary amplitude 309, the primary phase 301, and/or the primary frequency 303 of the primary winding 135 and/or the supply voltage 305 is described in more detail in FIG. 6B.

In one embodiment, the variable voltage variable frequency supply 129 modifies 503 the primary amplitude 309, the primary phase 301, and the primary frequency 303 of the primary winding 135 with the supply voltage 305 to match the main amplitude 319, the main phase 311, and the main frequency 313 of the main voltage 315 of the main power source 121.

In one embodiment, the amplitude 329 of the supply voltage 305 is modified 503 so that the primary voltage 306 induced in the primary winding 135 does not exceed the main voltage 315. The supply voltage 305 may be increased incrementally until the primary voltage 306 of the transformer primary winding 122 closely matches the main voltage 315 of the main power supply 121.

The sync detector 207 which may be incorporated in the line connection module 125 or in the controller 127 may determine 505 whether the primary amplitude 309, the primary phase 301, and the primary frequency 303 matches the main amplitude 319, the main phase 311, and the main frequency 313. In one embodiment, there is a match if the primary amplitude 309 is at least the specified voltage 201. In addition, there may be a match if the primary phase 301 is within a phase range of the main phase 311. The phase range may be plus/minus 5 percent. In a certain embodiment, there is a match if the primary frequency 303 is within a frequency range of the main frequency 313. The frequency range may be plus/minus 5 percent.

The supply voltage 305 applied to the tertiary winding 131 may be increased incrementally by the controller 127, the sync detector 207, and/or the variable voltage variable frequency supply 129 until the primary voltage 306 matches the main voltage 315. The voltage change rate 337 of the supply voltage 305 may be less than the change limit 339. In addition, the charging current 410 through the variable voltage variable frequency supply 129 may be less than the current limit 341.

The match of the primary amplitude 309, the primary phase 301, and the primary frequency 303 to the main amplitude 319, the main phase 311 and the main frequency 313 may be detected by a sync detector 207. In one embodiment, the sync detector 207 compares the primary amplitude 309, the primary phase 301, and/or primary frequency 303 from the primary winding 135 with the main amplitude 319, the main phase 311, and/or the main frequency 312.

In one embodiment, the sync detector 207 compares the main amplitude 319, main phase 311, and the main frequency 313 measured by the main sensor 203 and the primary amplitude 309, primary phase 301, and primary frequency 303 measured by the primary transformer sensor 205 to determine 505 a match as shown in FIG. 2A. In an alternate embodiment, the sync detector 207 compares the main amplitude 319, main phase 311, and the main frequency 313 measured by the main sensor 203 and the primary amplitude 309, the primary phase 301, and the primary frequency 303 measured by the primary voltage sensor 124 as shown in FIGS. 1C and 2C.

The sync detector 207 may be embodied in the controller 127 as shown in FIG. 4A. Alternatively, the sync detector 207 may be embodied in the line connection module 125 as shown in FIG. 2A.

The controller 127 and/or the variable voltage variable frequency supply 129 may modify 503 the supply voltage 305 until the primary amplitude 309, the primary phase 301, and the primary frequency 303 matches the main amplitude 319, the main phase 311, and the main frequency 313. In response to the primary amplitude 309, the primary phase 301, and the primary frequency 303 matching the main amplitude 319, the main phase 311, and the main frequency 313, the line connection module 125 connects 507 the main power source 121 to the power transformer 105 and the method 500 ends.

One embodiment, the controller 127 and/or sync detector 207 asserts the switch signal 101, activating the electromagnetic switch 211. In addition, the manual switch 209 may be closed. As a result, the main power 121 is connected to the primary power 122.

Figure 6B:
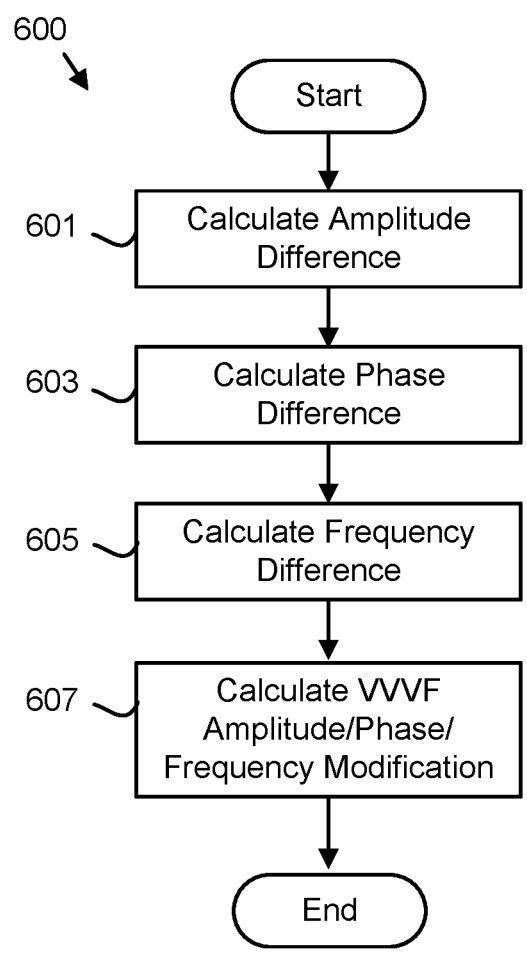
FIG. 6B is a schematic flow chart diagram of a modification method according to an embodiment.

FIG. 6B is a schematic flow chart diagram of a modification method 600. Method 600 may modify the variable voltage variable frequency supply 129 to match the primary amplitude 309, the primary phase 301, and the primary frequency 303 to the main amplitude 319, the main phase 311, and the main frequency 313. The method 600 may perform step 503 of FIG. 6A. The method 600 may be performed by the controller 127, the line connection module 125, and/or the variable voltage variable frequency supply 129.

The method 600 starts, and in one embodiment, the controller 127, sync detector 207, and/or variable voltage variable frequency supply 129 calculates 601 the amplitude difference 325. In addition, the controller 127, sync detector 207, and/or variable voltage variable frequency supply 129 may calculate 603 the phase difference 321. The controller 127, sync detector 207, and/or variable voltage variable frequency supply 129 may further calculate 605 the frequency difference 323.

The controller 127, sync detector 207, and/or variable voltage variable frequency supply 129 may calculate 607 an amplitude modification 335, a phase modification 331, and/or a frequency modification 333 for the voltage supply 305 and the method 600 ends. The amplitude modification 335, the phase modification 331, and/or the frequency modification 333 may be calculated 607 based on the amplitude difference 325, the phase difference 321, and/or the frequency difference 323.

PROBLEM/SOLUTION

There is an inrush of current from the main power source 121 to the power converter 100 when the power converter is powered up due to magnetizing the power transformer and charging the capacitive storage elements in the power cells. The inrush current may significantly reduce the main power source 121, causing transients, brownouts, and the like. In addition, the inrush current may stress the power cells 110.

The embodiments mitigate the inrush current from the main power source 121 by magnetizing the power transformer 105 with the supply voltage 305 and pre-charging the power cells 110 with the supply voltage 305. The embodiments may further modify the primary amplitude 309, the primary phase 301, and/or the primary frequency 303 of the primary voltage 306 with the supply voltage 305 to match the main amplitude 319, the main phase 311, and the main frequency 313 of the main voltage 315 of the power supply 121. As a result, when the main power source 121 is connected to the power transformer 105, there is minimal inrush current. Thus, the embodiments reduce damage to the main power source 121 and the power converter 100 while improving the efficiency of the power converter 100.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    magnetizing a power transformer of a power converter with a supply voltage from a variable voltage variable frequency supply;
    pre-charging power cells of the power converter fed from the power transformer to a specified voltage with the supply voltage;
    modifying a primary amplitude, a primary phase, and a primary frequency of a primary winding of the power converter with the supply voltage to match a main amplitude, a main phase, and a main frequency of a main voltage of a main power source; and
    in response to matching the primary amplitude, the primary phase, and the primary frequency to the main amplitude, the main phase, and the main frequency, connecting the main power source to the power transformer.

2. The method of claim 1, wherein the specified voltage is a preset voltage percentage of a winding rated voltage.

3. The method of claim 1, wherein the primary amplitude of the supply voltage is modified so that the supply voltage induced in the primary winding does not exceed the main voltage.

4. The method of claim 1, wherein the variable voltage variable frequency supply pre-charges a tertiary winding of the power transformer with the supply voltage.

5. The method of claim 4, wherein the supply voltage applied to the tertiary winding is increased incrementally by a controller until the primary voltage matches the main voltage.

6. The method of claim 4, wherein the supply voltage applied to the tertiary winding is increased incrementally by a sync detector until the primary voltage matches the main voltage.

7. The method of claim 1, wherein a voltage change rate of the supply voltage is less than a change limit.

8. The method of claim 6, wherein a charging current from the variable voltage variable frequency supply is less than a current limit.

9. The method of claim 1, wherein the match of the primary amplitude, the primary phase, and the primary frequency to the main amplitude, the main phase and the main frequency is detected by a sync detector that compares the primary amplitude, the primary phase, and primary frequency from the primary winding with the main amplitude, the main phase, and the main frequency.

10. The method of claim 9, wherein the sync detector compares the main amplitude, main phase, and the main frequency measured by a main sensor and the primary amplitude, primary phase, and primary frequency measured by a primary transformer sensor.

11. The method of claim 9, wherein the sync detector compares the main amplitude, main phase, and the main frequency measured by a main sensor and the primary amplitude, the primary phase, and the primary frequency measured by a primary voltage sensor.

12. The method of claim 9, wherein the sync detector is embodied in a controller.

13. The method of claim 9, wherein the sync detector is embodied in a line connection module.

14. An apparatus comprising:
a variable voltage variable frequency supply that magnetizes a power transformer of a power converter with a supply voltage applied to a tertiary winding and pre-charges power cells of the power converter fed from the power transformer to a specified voltage with the supply voltage;
a controller that modifies a primary amplitude, a primary phase, and a primary frequency of a primary winding of the power converter with the supply voltage to match a main amplitude, a main phase, and a main frequency of a main voltage of a main power source; and
a line connection module that in response to matching the primary amplitude, the primary phase, and the primary frequency to the main amplitude, the main phase, and the main frequency, connects the main power source to the power transformer.

15. The apparatus of claim 14, wherein the specified voltage is a preset voltage percentage of a winding rated voltage.

16. The apparatus of claim 14, wherein the primary amplitude of the supply voltage is modified so that the supply voltage induced in the primary winding does not exceed the main voltage.

17. The apparatus of claim 14, wherein the supply voltage applied to the tertiary winding is increased incrementally by the controller until the primary voltage matches the main voltage.

18. The apparatus of claim 14, wherein the supply voltage applied to the tertiary winding is increased incrementally by a sync detector until the primary voltage matches the main voltage.

19. The apparatus of claim 14, wherein a voltage change rate of the supply voltage is less than a change limit.

20. A system comprising:
a power converter comprising a primary winding, a core, secondary winding sets, and a tertiary winding that powers a fan;
a variable voltage variable frequency supply that magnetizes a power transformer of a power converter with a supply voltage applied to the tertiary winding and pre-charges power cells of the power converter fed from the power transformer to a specified voltage with the supply voltage;
a controller that modifies a primary amplitude, a primary phase, and a primary frequency of the primary winding with the supply voltage to match a main amplitude, a main phase, and a main frequency of a main voltage of a main power source; and
a line connection module that in response to matching the primary amplitude, the primary phase, and the primary frequency to the main amplitude, the main phase, and the main frequency, connects the main power source to the power transformer.

* * * * *